United States Patent [19]

Hamann

[11] 4,367,696

[45] Jan. 11, 1983

[54] CAT MANAGEMENT CHAMBER

[76] Inventor: Dennis R. Hamann, 5345 N. Lovers Lane Rd., Milwaukee, Wis. 53225

[21] Appl. No.: 320,275

[22] Filed: Nov. 12, 1981

[51] Int. Cl.³ .............................................. A01K 29/00
[52] U.S. Cl. ...................................... 119/96; 119/103
[58] Field of Search .................... 119/96, 103; 217/64

[56] References Cited

U.S. PATENT DOCUMENTS

| 98,609 | 4/1870 | Michael | 217/64 |
|---|---|---|---|
| 391,766 | 10/1888 | Turner | 217/64 |
| 833,692 | 10/1906 | Neff | 119/103 |
| 987,752 | 3/1911 | Short et al. | 217/64 |
| 1,234,733 | 7/1919 | Corington | 119/103 |
| 1,455,101 | 5/1923 | Barlow | 119/103 |
| 1,508,548 | 9/1924 | Gotheimer | 217/64 |
| 2,781,740 | 2/1957 | Duffy | 119/103 |
| 3,094,101 | 6/1962 | Porter | 119/103 |
| 3,580,220 | 5/1971 | Cook | 119/103 X |

FOREIGN PATENT DOCUMENTS 784842 12/1980 U.S.S.R. ................................ 119/96

Primary Examiner—Jay N. Eskovitz
Attorney, Agent, or Firm—Henry C. Fuller

[57] ABSTRACT

A cat management chamber for confining a cat during treatment or administration of anesthesia comprises a box-like structure with a vertically adjustable lid which is positioned at appropriate height above the cat with a series of vertical apertures in the side walls and a U-shaped locking pin handle combination which extends through the apertures and sleeves or tubes in the lid.

1 Claim, 3 Drawing Figures

U.S. Patent    Jan. 11, 1983    4,367,696
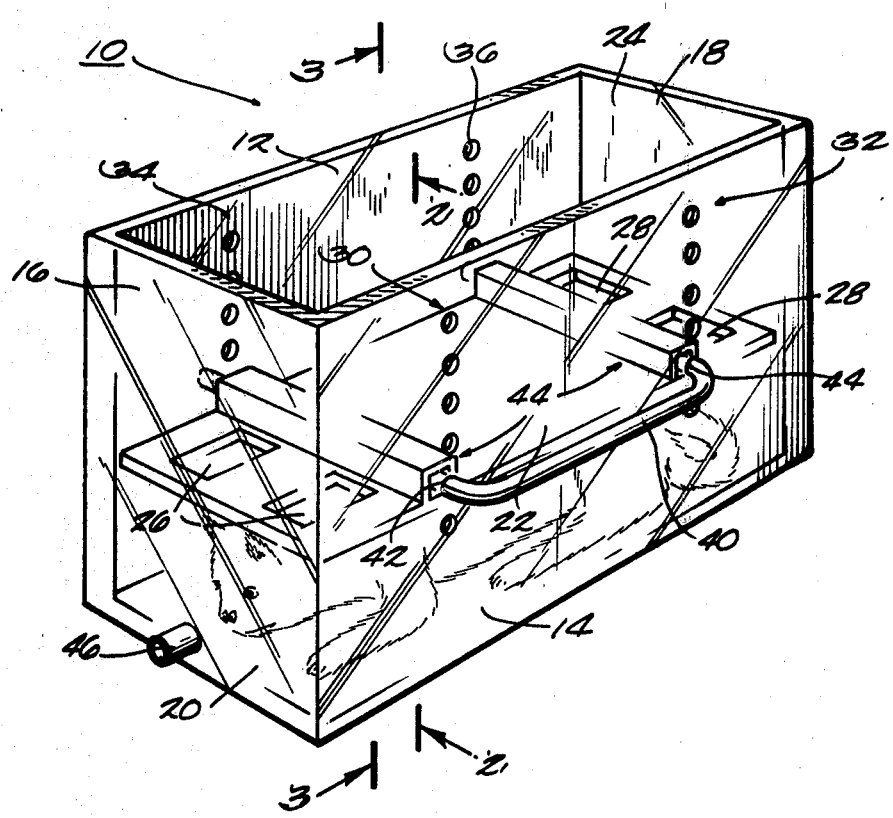
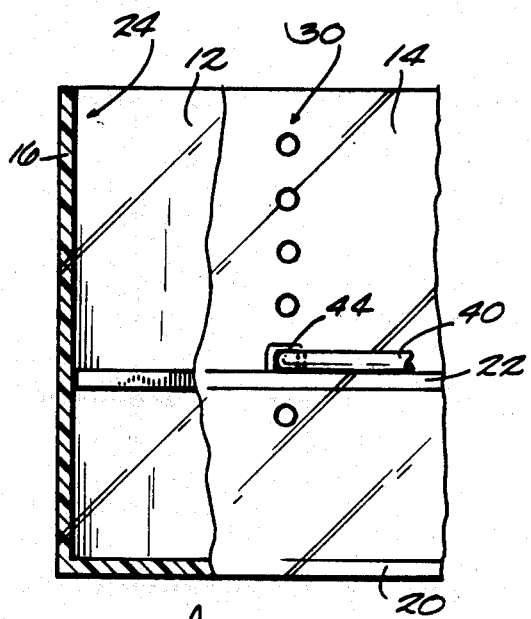
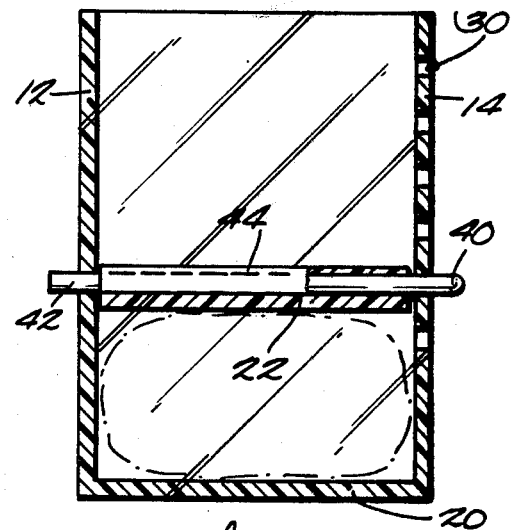

CAT MANAGEMENT CHAMBER

BACKGROUND OF THE INVENTION

The present invention relates to a restraining or confining device particularly adapted for cats which is used to confine the cat during the administration of medication by injection. The chamber can also be employed to confine the cat during the administration of a gas anesthesia.

SUMMARY OF THE INVENTION

The invention provides an inexpensive confinement chamber which has an adjustable upper partition which is removed during insertion of the cat, placed over the cat and lowered into the appropriate position for the degree of restraint required. The adjustability of the partition is afforded by a series of vertically aligned apertures in opposed side walls of the chamber and a U-shaped handle or locking pin which is extended through the side apertures through the side apertures through loops or tubes on the partition and into the opposed apertures on the other side wall. Openings in the partition provide access for injections or the like. A nipple for administering anesthesia is provided in an end wall.

Further objects, advantages and features of the invention will become apparent from the disclosure.

DESCRIPTION OF THE DRAWINGS

FIG. 1 is a perspective view of a cat management chamber in accordance with the invention.

FIG. 2 is a fragmentary sectional view along line 2—2 of FIG. 1.

FIG. 3 is a sectional view along line 3—3 of FIG. 1.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The cat management chamber 10 includes opposed side walls 12 and 14, end walls 16 and 18 and a bottom wall 20. A lid or partition 22 is provided which is movable vertically within the interior 24 of the chamber in opposed relationship to the bottom 14. The partition 22 is provided with various openings 26, 28 for administering medication and innoculations or the like.

In accordance with the invention, means are provided for vertically adjustably positioning the partition 22 to provide a varying degree of restraint on the cat located in the chamber. In the disclosed construction, the means comprises two rows 30, 32 of vertically aligned apertures in side wall 14 and corresponding rows 34 and 36 in side wall 12, with the apertures in rows 34 and 36 aligned with corresponding apertures in wall 14. A U-shaped locking pin 40 is provided with end portions or legs 42 and 44 which are spaced to interfit in the vertically aligned apertures. The partition 40 is provided with spaced tubes or channel portions 44 which are spaced to receive the legs of the handle 40.

An inlet nipple 46 can be provided for administering a gas anesthesia. The wall and top are desirably transparent.

I claim:

1. A restraining device for a cat to confine the cat during administration of medication comprising wall means defining an enclosure having a bottom wall, end walls and spaced side walls, a partition movable within said walls in opposed relationship to said bottom wall and means for selectively adjustably positioning said partition relative to said bottom wall to provide an appropriate space there between to confine the cat located therein, said means comprising a U-shaped handle having a web portion and projecting parallel end portions interconnected by an intermediate portion, said end portions having a length greater than the distance between said side walls, each of said side walls having two spaced vertically aligned rows or apertures with the rows in each side wall spaced at the same distance from the adjacent end walls and from each other and the height of corresponding apertures on each side wall being approximately the same and said partition having sleeve portions generally spanning the partition, said sleeve portions being spaced to receive the end portions of said handle so that said handle can be inserted through two horizontally aligned apertures in one side wall and be guided for movement into two horizontally aligned apertures in the opposite side wall by said sleeve portions so that any four of said apertures can be employed to support the partition at the selected height, with said handle web portion located laterally outwardly of a side wall for easy access.

* * * * *